(12) United States Patent
Dage et al.

(10) Patent No.: US 7,617,692 B2
(45) Date of Patent: Nov. 17, 2009

(54) FUEL EFFICIENT METHOD AND SYSTEM FOR HYBRID VEHICLES

(75) Inventors: Gerhard A. Dage, Franklin, MI (US); Wayne Frank Buescher, Canton, MI (US); Thomas J. Fox, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 735 days.

(21) Appl. No.: 11/275,081

(22) Filed: Dec. 8, 2005

(65) Prior Publication Data

US 2006/0117775 A1 Jun. 8, 2006

Related U.S. Application Data

(60) Provisional application No. 60/634,346, filed on Dec. 8, 2004.

(51) Int. Cl.
*B60H 1/32* (2006.01)
*F25B 1/00* (2006.01)
*F25B 49/00* (2006.01)

(52) U.S. Cl. .............................. 62/133; 62/229; 62/230; 62/236

(58) Field of Classification Search ................... 62/133, 62/228.1, 229, 230, 236, 244
See application file for complete search history.

(56) References Cited

U.S. PATENT DOCUMENTS

| 5,142,880 A | * | 9/1992 | Bellis ........................... 62/182 |
| 5,516,041 A | | 5/1996 | Davis, Jr. et al. |
| 5,553,776 A | | 9/1996 | Davis, Jr. et al. |
| 5,570,838 A | | 11/1996 | Davis, Jr. et al. |
| 6,729,998 B2 | * | 5/2004 | Egami ............................ 477/3 |
| 7,177,742 B2 | * | 2/2007 | Makishima et al. ........... 701/36 |
| 2004/0079098 A1 | * | 4/2004 | Uno et al. ..................... 62/236 |

* cited by examiner

*Primary Examiner*—Marc E Norman
(74) *Attorney, Agent, or Firm*—David B. Kelley; Brooks Kushman P.C.

(57) ABSTRACT

A method and system determines when a climate control system of a hybrid vehicle can be operated without the use of an A/C compressor. The method and system make this determination by determining whether the vehicle is at idle or is being driven and determining whether or not the A/C compressor is required to function to maintain air conditioning comfort in the vehicle. The A/C compressor couples to an engine of the vehicle when the engine is on in order to function. The method and system turn off the engine and thereby turn off the A/C compressor if the A/C compressor is not required to function and if the vehicle is at idle. The method and system turn off the A/C compressor without turning off the engine if the A/C compressor is not required to function and if the vehicle is being driven.

8 Claims, 4 Drawing Sheets

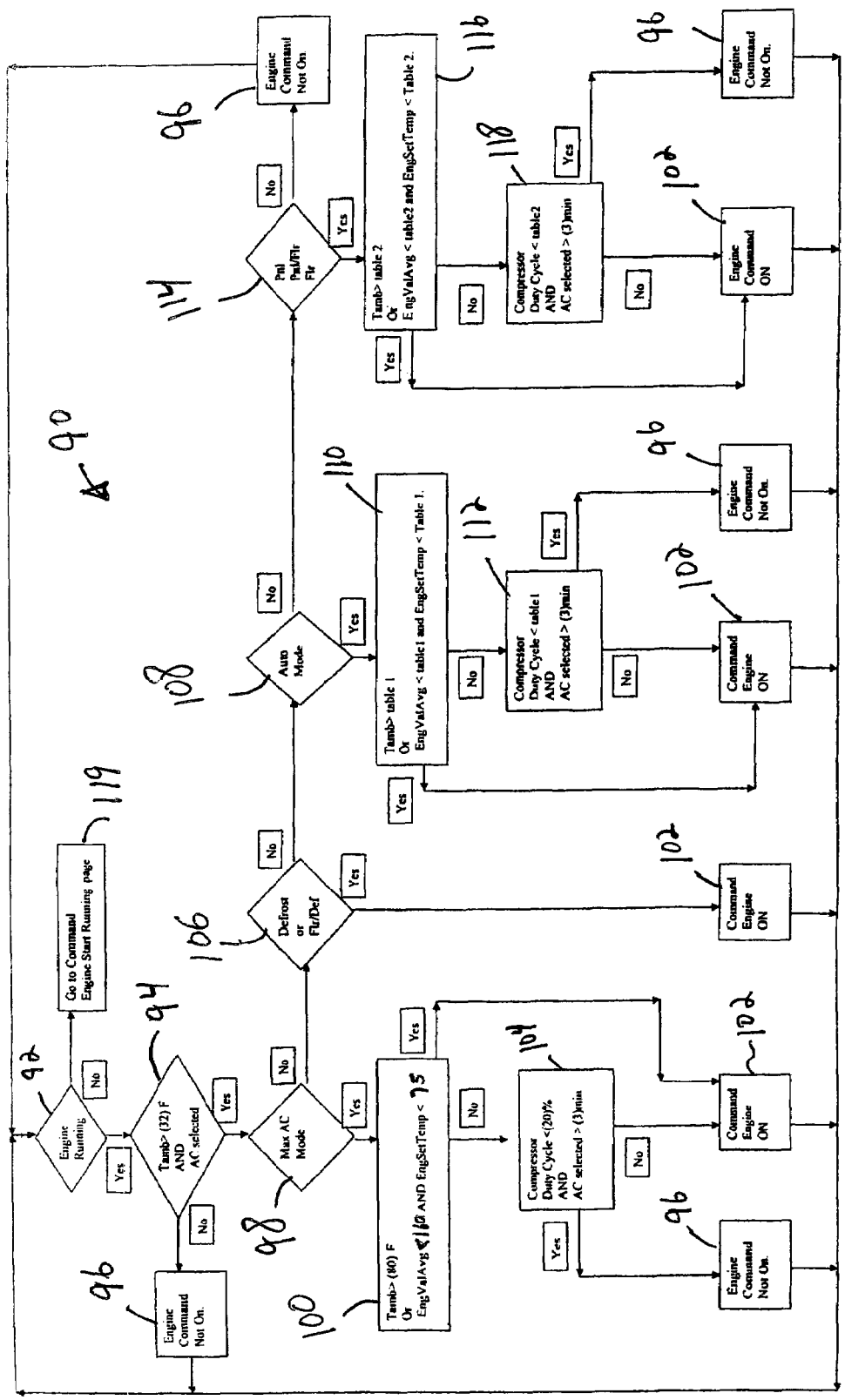

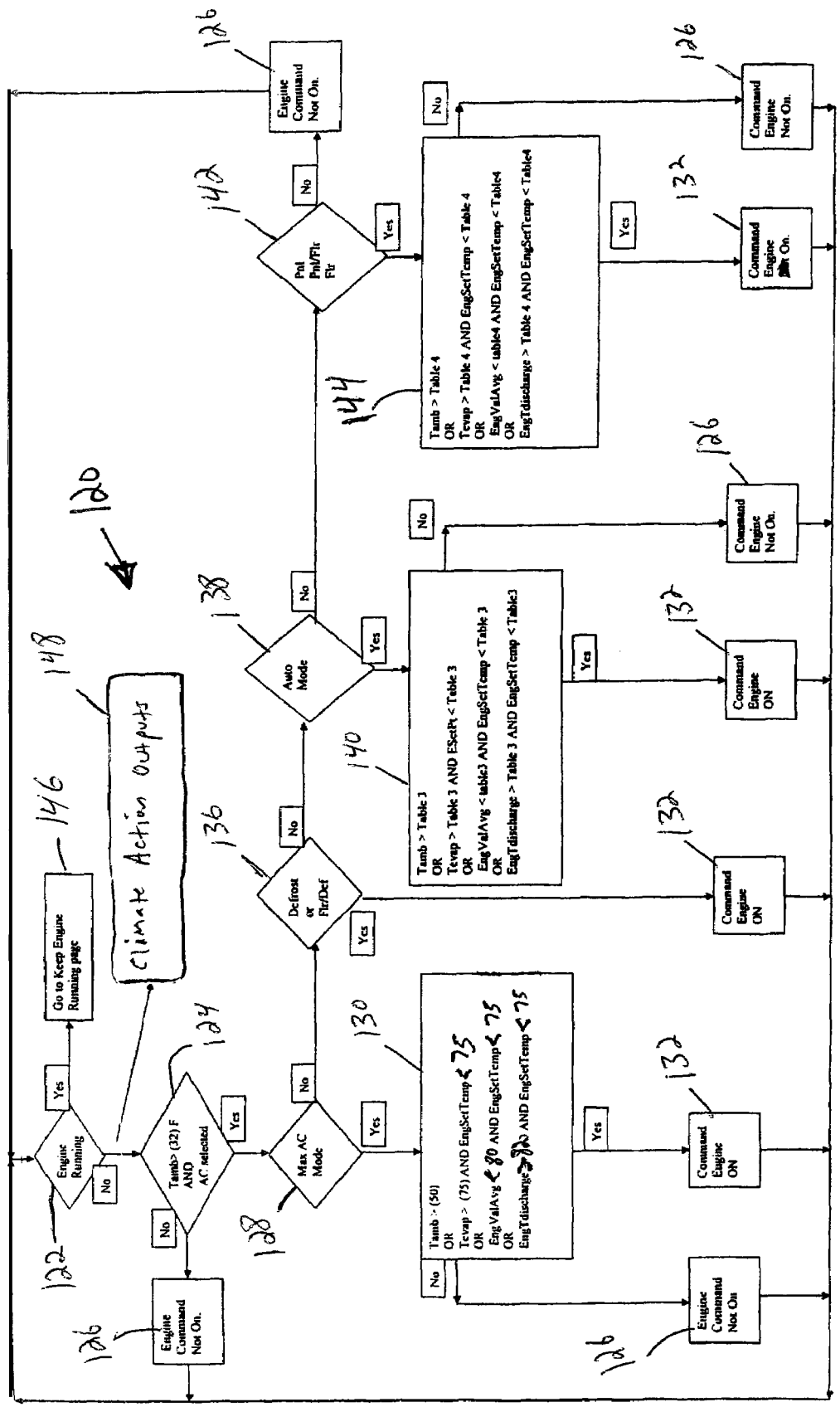

FUEL EFFICIENT METHOD AND SYSTEM FOR HYBRID VEHICLES

CROSS-REFERENCE TO RELATED APPLICATIONS

This application claims the benefit of U.S. provisional application Ser. No. 60/634,346 filed Dec. 8, 2004.

BACKGROUND OF THE INVENTION

1. Field of the Invention

The present invention relates to HVAC (heating, ventilation, and air conditioning) methods and systems for improving fuel economy and emissions of hybrid vehicles during mild ambient conditions.

2. Background Art

A typical HVAC system of a hybrid vehicle does not have the necessary inputs, processing power, and control strategies to make intelligent decisions as to when to turn the A/C (air conditioning) compressor of the vehicle off in order to improve fuel economy and emissions. That is, the typical HVAC system of a hybrid vehicle is not able to make an intelligent decision as to when the engine of the vehicle can be turned off in order to turn off the A/C compressor while the vehicle is at idle. Similarly, the typical HVAC system of a hybrid vehicle is not able to make an intelligent decision as to when to turn the A/C compressor off (without the engine of the vehicle being turned off) while the vehicle is being driven.

As such, a problem associated with hybrid vehicles having typical HVAC systems can be broken down into two operating conditions: 1) at idle (i.e., while the vehicle is at a stop); and 2) while driving (i.e., while the vehicle is being driven).

In the first operating condition in which the vehicle is at idle, a hybrid vehicle operates its engine whenever the A/C compressor has been requested in order to provide the cooling power necessary in the event it is required. Also, the A/C compressor is always requested when the HVAC system is in automatic mode whether or not the A/C compressor is required for comfort. The engine of the hybrid vehicle is operated (i.e., turned on) while the vehicle is at idle because, as indicated above, the HVAC system of the vehicle is not able to make an intelligent decision to turn the engine off (and thus turn off the A/C compressor) to improve fuel economy and emissions.

In the second operating condition in which the vehicle is being driven, a hybrid vehicle operates the A/C compressor in order to provide the cooling power necessary in the event it is required. Also, the A/C compressor is always requested when the HVAC system is in automatic mode whether or not the A/C compressor is required for comfort. The A/C compressor is operated (i.e., turned on) while the vehicle is being driven because, as indicated above, the HVAC system of the vehicle is not able to make an intelligent decision to turn the A/C compressor off (while the engine remains on and operated) to improve fuel economy and emissions.

SUMMARY OF THE INVENTION

In general, the present invention provides a method and system for determining when it is possible to operate the climate control HVAC system of a hybrid vehicle without the use of the A/C compressor and still maintain comfort to thereby improve fuel economy and emissions.

The method and system of the present invention use multiple inputs, timers, and look-up tables as key factors coupled with novel strategies to determine when it is possible to operate the HVAC system of a hybrid vehicle without the use of the A/C compressor and still maintain comfort. A purpose of this is to: 1) shut off the engine of the hybrid vehicle (and thereby shut off the A/C compressor) while the vehicle is at idle (i.e., while the vehicle is at a stop) in order to improve fuel economy and emissions; and 2) shut off the A/C compressor of the hybrid vehicle while the vehicle is being driven in order to improve fuel economy and emissions.

In operation, the run time duty cycle of the A/C compressor is monitored after the A/C compressor has operated for a period of time (such as at least three minutes). Other variables such as the ambient temperature (Tamb), the engine value average (EngValAvg), the engine set temperature (EngSetTemp), the vehicle speed, the evaporator temperature, and the blend door position are also monitored.

When the vehicle comes to a stop (i.e., at idle) and when the vehicle is being driven, the method and system compare the values of monitored conditions to reference values in accordance with flow strategies to determine whether or not the A/C compressor is required to function in order to maintain comfort. If the A/C compressor is not required to maintain comfort, the method and system turn off the A/C compressor until such time that the monitored conditions as specified in the flow strategies necessitate operation of the A/C compressor.

Briefly, the method and system compare the duty cycle of the A/C compressor to duty cycle reference values in accordance with the flow strategies to determine the amount of contribution the A/C compressor is adding to comfort. If it is determined that the A/C compressor is having a negligible impact on comfort, the method and system turn off the A/C compressor.

The advantages associated with the method and system include improving fuel economy and tailpipe emissions by: 1) turning the engine off (and thereby turning off the A/C compressor) while the vehicle is at idle when the A/C compressor is having a negligible impact on comfort; and 2) turning the A/C compressor off while the vehicle is being driven when the A/C compressor is having a negligible impact on comfort.

In one embodiment, the present invention provides a method for operating a climate control system of a hybrid vehicle without the use of an A/C compressor of the climate control system. The method includes determining whether the vehicle is at idle or is being driven, and determining whether or not the A/C compressor is required to function to maintain air conditioning comfort in the vehicle. The A/C compressor couples to an engine of the vehicle when the engine is on in order to function. The method includes turning off the engine and thereby turning off the A/C compressor if the A/C compressor is not required to function and if the vehicle is at idle. The method includes turning off the A/C compressor without turning off the engine if the A/C compressor is not required to function and if the vehicle is being driven.

In another embodiment, the present invention provides a climate control system of a hybrid vehicle. The system includes an A/C compressor which couples to an engine of the vehicle when the engine is on in order to function. The system further includes a controller for determining whether the A/C compressor is required to function to maintain air conditioning comfort in the vehicle. The controller turns off the engine and thereby turns off the A/C compressor if the A/C compressor is not required to function and if the vehicle is at idle. The controller turns off the A/C compressor without turning off the engine if the A/C compressor is not required to function and if the vehicle is being driven.

Further advantages, objectives and features of the present invention will become apparent from the following detailed description and the accompanying figures disclosing illustrative embodiments of the present invention.

BRIEF DESCRIPTION OF THE DRAWINGS

FIG. 3 illustrates a flow chart describing operation of a flow strategy for deciding when to keep the engine of a hybrid vehicle running for A/C compressor operation in accordance with the present invention; and FIG. 4 illustrates a flow chart describing operation of a flow strategy for deciding when to command the engine of a hybrid vehicle to start running for A/C compressor operation in accordance with the present invention.

DETAILED DESCRIPTION OF THE PREFERRED EMBODIMENT(S)

Figure 1:
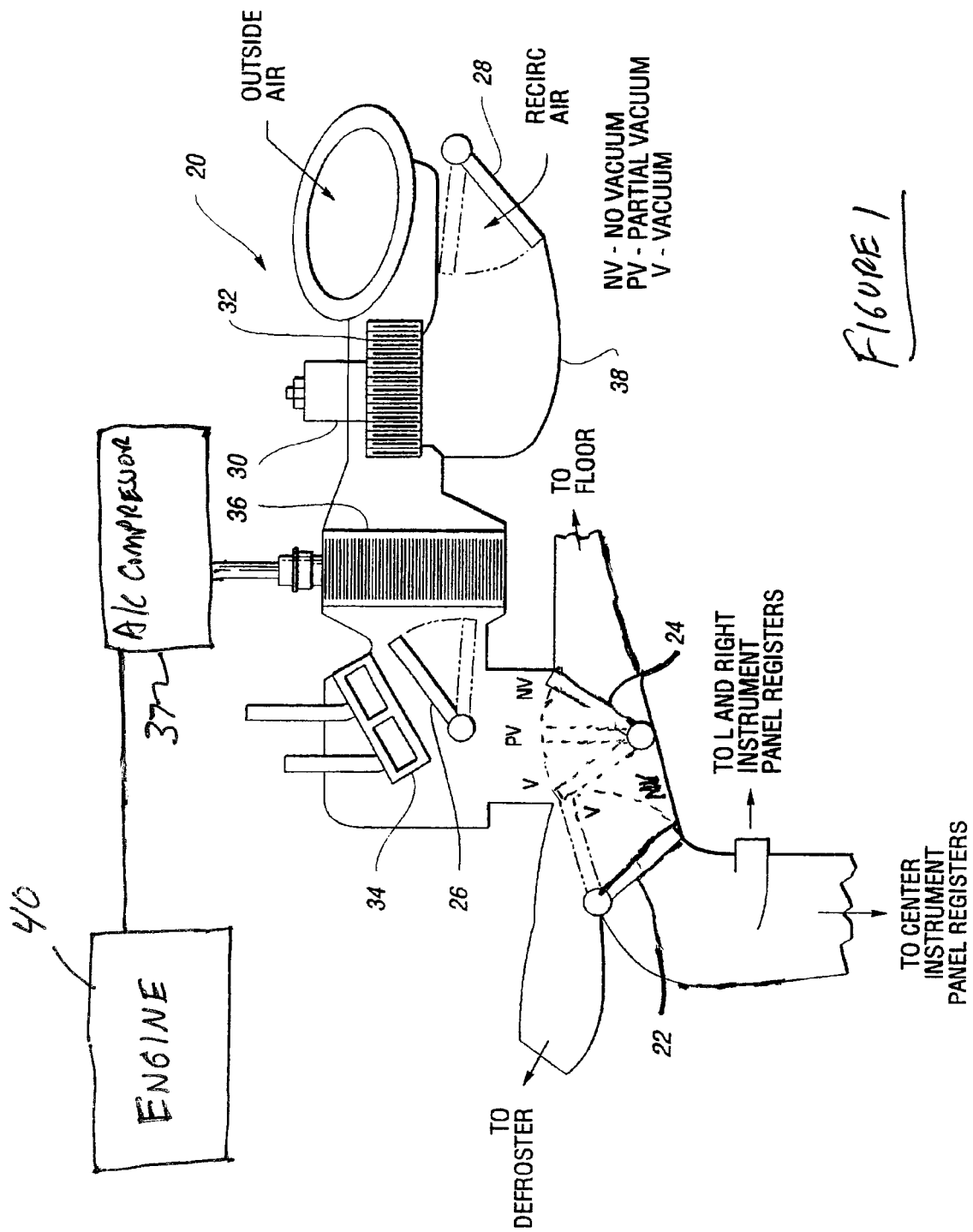
FIG. 1 illustrates a heating, ventilation, and air conditioning (HVAC) system of a hybrid vehicle which is controllable in accordance with the present invention.

Referring now to FIG. 1, a heating, ventilation, and air conditioning (HVAC) system 20 of a hybrid vehicle controllable by the method and system of the present invention is shown. HVAC system 20 includes an arrangement of defrost, floor, temperature blend, and outside recirculation doors 22, 24, 26, and 28. Doors 22 and 24 are preferably driven by vacuum motors between their various vacuum, partial vacuum, and no vacuum positions in a conventional fashion as indicated by FIG. 1. Door 26 is driven by an electric servo motor in a conventional fashion. Door 28 may also be driven by an electric servo motor so that the position of door 28 is continuously variable.

HVAC system 20 includes a variable speed motor 30 including a blower wheel 32. HVAC system 20 includes heating and cooling elements in a vehicle air conditioning plant. The heating and cooling elements include a heater core 34 and an evaporator core 36. The evaporator temperature is controlled to allow HVAC system 20 to dehumidify air passing thereover.

The air conditioning plant includes an A/C compressor 37. A/C compressor 37 is selectively coupled to engine 40 of the hybrid vehicle by a control element such as an A/C clutch. The air conditioning plant may include a condenser, a refrigerant tank, pressure cycling switch, and an expansion orifice or capillary.

Each of the above components are connected via ducting 38. In this way, the above components control temperature, the direction of air flow, and the ratio of fresh air to recirculated air.

Figure 2:
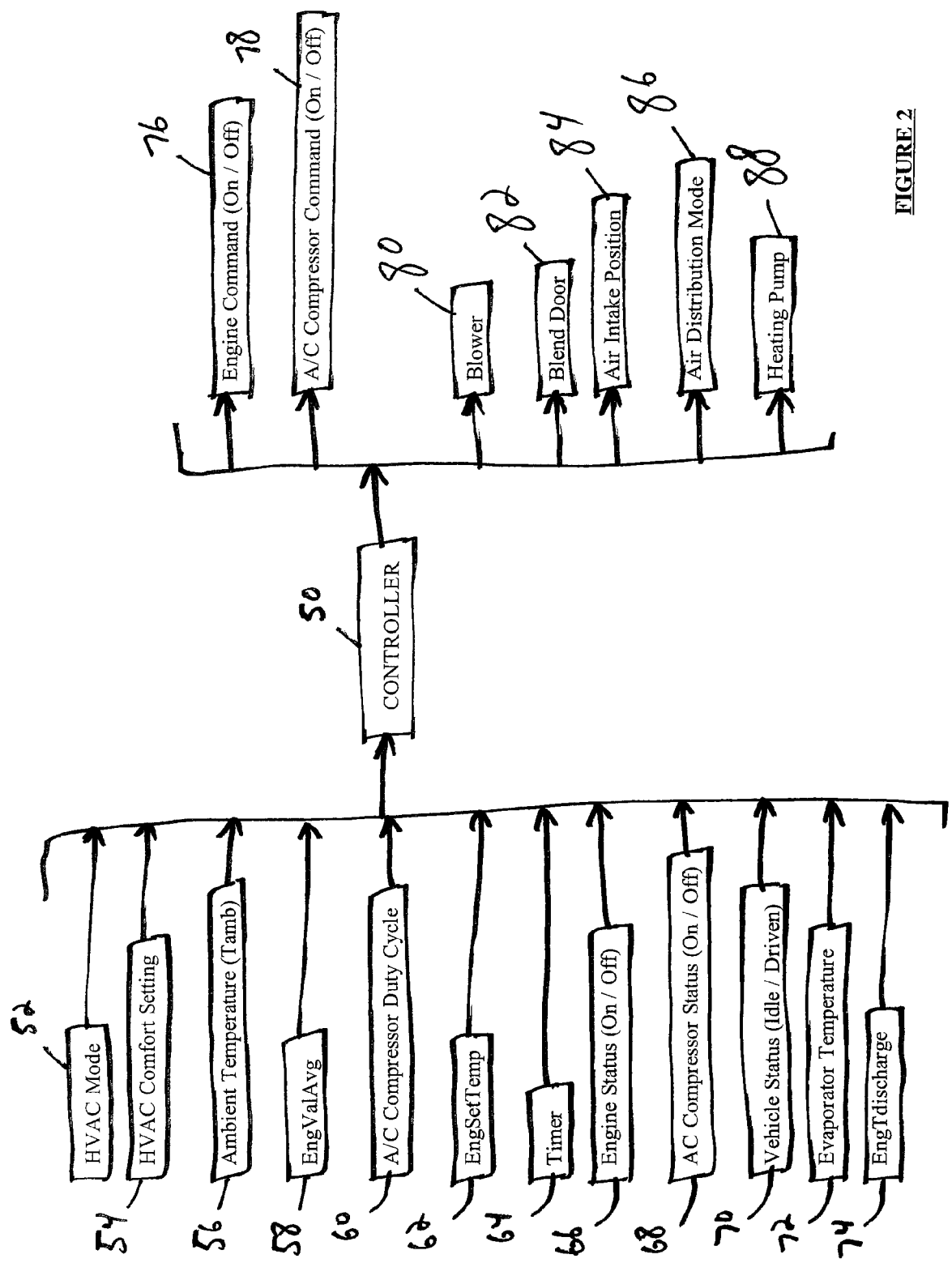
FIG. 2 illustrates a block diagram of an HVAC system controller in accordance with the present invention.

Referring now to FIG. 2, with continual reference to FIG. 1, a block diagram of an HVAC system controller 50 in accordance with the present invention is shown. Controller 50 uses inputs and look-up tables as factors coupled with flow strategies for determining when it is possible to operate HVAC system 20 without the use of A/C compressor 37 and still maintain comfort. That is, controller 50 determines when engine 40 (and thereby A/C compressor 37) can be shut off while the vehicle is at idle to thereby improve fuel economy and emissions; and the controller determines when A/C compressor 37 can be shut off (will not turn off engine 40) while the vehicle is being driven to thereby improve fuel economy and emissions.

The inputs to controller 50 may include HVAC system mode setting 52, HVAC system comfort mode setting 54, ambient temperature (Tamb) 56, engine value average (EngValAvg) 58, A/C compressor duty cycle 60, engine set temperature (EngSetTemp) 62, timer 64, engine status (on/off) A/C compressor status (on/off) 68, vehicle status (idle/driven) 70, evaporator temperature 72, and engine discharge air temperature (EngTdischarge) 74.

HVAC system 20 has different operating modes such as maximum AC mode, defrost modes (defrost, floor/defrost), automatic mode, and other manual modes (panel, panel/floor, floor). HVAC system mode setting input 52 is indicative of the mode that HVAC system 20 is in at any given time.

For each operating mode, HVAC system 20 provides different levels of comfort. For example, a first level of comfort provides minimum comfort for any given operating mode; and a second level of comfort provides maximum comfort for any given operating mode. The comfort settings for the operating modes of HVAC system 20 are service/customer selectable. The comfort settings are adjustable with multiple button presses on a front panel of HVAC system 20 or with dealer diagnostic tools. In general, each operating mode of HVAC system 20 has four comfort settings ("0", "1", "2", and "3"). Setting "0" turns off the comfort (i.e., the engine is shut off at a vehicle stop); setting "1" provides minimum comfort action; setting "2" is an initial factory setting; and setting "3" provides maximum comfort action. HVAC system comfort mode setting input 54 is indicative of the comfort setting that HVAC system 20 is in at any given time.

Ambient temperature (Tamb) input 56 is indicative of the temperature inside of the vehicle cabin. Engine value average, engine set temperature, and engine discharge air temperature inputs 58, 62, and 74 are indicative of operating conditions of engine 40. A/C compressor duty cycle input 60 is indicative of the run time duty cycle of A/C compressor 37 as the A/C compressor couples to engine 40 over a given period of time for providing air conditioning operations. Timer input 64 is indicative of a running total of time from given initial starting points. Engine status input 66 is indicative of whether engine 40 is on or off while the vehicle is at idle (the engine will be on while the vehicle is being driven). A/C compressor status input 68 is indicative of whether A/C compressor 37 is on or off while the vehicle is at idle or is being driven (the A/C compressor will be off while the engine is off). Vehicle status input 70 is indicative of whether the vehicle is at a stop (i.e., idle) or whether the vehicle is being driven. Evaporator temperature input 74 is indicative of the temperature of the evaporator temperature.

As indicated above, controller 50 processes the inputs and uses look-up tables in accordance with flow strategies (described in detail with reference to FIGS. 3 and 4) for determining when it is possible to operate HVAC system 20 without the use of A/C compressor 37 and still maintain comfort. Based on its determinations, controller 50 provides command outputs for controlling A/C compressor 37 and engine 40; and provides climate action outputs for controlling other elements of HVAC system 20 in order to delay loss of cooling comfort when the A/C compressor is shut off.

More specifically, depending on its determinations, controller 50 provides: an engine "on" command 76 which causes engine 40 to continue running (while the vehicle is idle or is being driven) or to start running (while the vehicle is idle); an engine "off" command 76 which causes the engine to stop running (while the vehicle is idle) or to refrain from starting to run (while the vehicle is idle); an A/C compressor "on" command 78 which causes A/C compressor 37 to continue running (while the vehicle is idle or is being driven) or to start running (while the vehicle is idle or is being driven); and an A/C compressor "off" command 78 which causes the A/C compressor to stop running (while the vehicle is idle or is being driven) or to refrain from starting to run (while the vehicle is idle or is being driven). An engine "off" command 76 causes both A/C compressor 37 and engine 40 to be turned off and an engine "on" command causes both of the A/C compressor and the engine to be turned on.

Upon outputting a command to cause A/C compressor outputs for controlling other elements of HVAC system 20 in order to delay loss of cooling comfort as a result of the A/C compressor being turned off. The climate action outputs include blower speed 80, blend door 82, air intake position 84, air distribution mode 86, and heating pump 88 outputs. Blower speed output 80 causes no changes to manual blower speed selections for blower wheel 32, but adds filters to the auto blower operation. Blend door position output 82 causes temperature blend door 26 to be driven to toward full cold action. Air intake position output 84 defaults auto recirculation to the outside, but causes no changes to manual recirculation. Air distribution mode output 86 causes no changes. Heating pump output 88 provides a request to turn off warm Tambient.

Referring now to FIG. 3, with continual reference to FIGS. 1 and 2, a flow chart 90 describing operation of a flow strategy employed by controller 50 for deciding when to keep engine 40 running for operation of A/C compressor 37 is shown. Initially, controller 50 processes engine status input 66 to determine whether engine 40 is running as shown in decision block 92 (it is noted that the engine is running when the vehicle is being driven). If engine 40 is running, then controller 50 processes HVAC mode input 52 and Tamb input 56 to respectively determine if "AC" is selected and if the ambient temperature is at least 32° F. as shown in decision block 94. If at least one of these engine "off" command 76 (if the vehicle is idle) or an A/C compressor "off" command 78 (if the vehicle is being driven) as shown in block 96. The net result is that A/C compressor 37 and engine 40 are both turned off if the vehicle is idle or the A/C compressor is turned off (while the engine remains running) if the vehicle is being driven. The process then repeats by returning to decision block 92.

If "AC" is selected and the ambient temperature is at least 32° F. as shown in decision block 94, then controller 50 processes HVAC mode input 52 to determine the mode of HVAC system 20. As indicated above, the modes of HVAC system 20 include maximum AC mode, defrost modes (defrost and floor/defrost modes), automatic mode, manual modes (panel, panel/floor, and floor modes).

If controller 50 determines that HVAC system 20 is in the maximum AC mode at decision block 98, then the controller processes Tamb input 56 to determine whether the ambient temperature is at least 80° F. as shown in decision "on" command 76 as shown in block 102. The net result is that A/C compressor 37 and engine 40 remain on (regardless of whether the vehicle is idle or is being driven). The process then repeats from block 102 by starting at decision block 92. Further, in decision block 100, controller 50 processes EngValAvg input 58 to determine if it has a value of less than 160 and processes EngSetTemp input 62 to determine if it has a value less than 75° F. If both of engine "on" command 76 as shown in block 102 and the process then repeats by returning to decision block 92. If neither of the two sets of conditions are true in decision block 100, then controller 50 processes A/C compressor duty cycle input 60 and timer input 64 to respectively determine if the compressor duty cycle is less than 20% and if the "AC" has been running for at least three minutes as shown in decision block 104. If at least one of these two conditions are as shown in block 102 and the process then repeats by returning to decision block 92. If both of these conditions are true, then controller 50 either outputs an engine "off" command 76 (if the vehicle is idle) or an A/C compressor "off" command 78 (if the vehicle is being driven) as shown in block 96 and the process then repeats by returning to decision block 92.

If controller 50 determines that HVAC system 20 is in a defrost mode at decision block 106, then the controller outputs an engine "on" command 76 as shown in block 102 and the process then repeats by returning to block 92.

If controller 50 determines that HVAC system 20 is in the automatic mode at decision block 108, then the controller processes HVAC comfort setting input 54 to determine the comfort setting ("0", "1", "2", or "3") of HVAC system 20. In general, controller 50 then compares various inputs (namely, ambient temperature input 56, EngValAvg input 58, A/C compressor duty cycle input 60, and EngSetTemp input 62) with reference values set forth in the following Table 1 to determine whether or not to keep engine 40 running for operation of A/C compressor 37. The reference values listed in Table 1 depend upon the comfort setting of HVAC system 20.

TABLE 1

| | (Automatic Mode) | | | |
|---|---|---|---|---|
| Comfort Set. | Tamb | EngValAvg | CompDutyCycle | EngSetTemp |
| 0 | 90 | 200 | 90 | 76 |
| 1 | 80 | 160 | 70 | 75 |
| 2 | 70 | 130 | 50 | 73 |
| 3 | 60 | 100 | 20 | 71 |

As such, in decision block 110, controller 50 determines whether ambient temperature input 56 is greater than the reference Tamb value listed in Table 1 for the comfort setting of HVAC system 20. For example, if the comfort setting of HVAC system 20 is "1", then controller 50 determines whether ambient temperature input 56 is greater than 80° F.; similarly, if the comfort setting of the HVAC system is "3", then the controller determines whether the ambient temperature input is greater than 60° F. If the an engine "on" command 76 as shown in block 102 and the process then repeats by returning to decision block 92. Further, in decision block 110, controller 50 processes EngValAvg input 58 and EngSetTemp input 62 to determine if they have values less than the EngValAvg and EngSetTemp reference values listed in Table 1 for the comfort setting of HVAC system 20. For example, if the comfort setting is "2", then controller 50 determines whether EngValAvg is less than the reference value of 130 and the controller determines whether EngSetTemp is less than the reference value of 73° F. If both of these conditions are true, then controller 50 outputs an engine "on" command 76 as shown in block 102 and the process then repeats by returning to decision block 92. If neither of the two sets of conditions are true in decision block 110, then controller 50 processes A/C compressor duty cycle input 60 and timer input 64 to respectively determine if the compressor duty cycle is less than the CompDutyCycle reference value listed in Table 1 for the comfort setting of HVAC system 20 and if the "AC" has been running for at least three minutes as shown in decision block 112. For example, if the comfort setting is "1", then the controller 50 determines whether the compressor duty cycle is less than the reference value of 70%. If at least outputs an engine "on" command 76 as shown in block 102 and the process then repeats by returning to decision block 92. If both of these conditions are true, then controller 50 either outputs an engine "off" command 76 (if the vehicle is idle) or an A/C compressor "off" command 78 (if the vehicle is being driven) as shown in block 96 and the process then repeats by returning to decision block 92.

If controller 50 determines that HVAC system 20 is in a panel, panel/floor, or floor mode at decision block 114, then the controller processes HVAC comfort setting input 54 to determine the comfort setting ("0", "1", "2", or "3") of HVAC system 20. In general, controller 50 then compares various inputs (namely, ambient temperature input and EngSetTemp input 62) with reference values set forth in the following Table 2 to determine whether or not to keep engine 40 running for operation of A/C compressor 37. As shown, the reference values listed in Table 2 depend upon the comfort setting of HVAC system 20.

TABLE 2

| (Panel, Panel/Floor, Floor Modes) | | | | |
|---|---|---|---|---|
| Comfort Set. | Tamb | EngValAvg | CompDutyCycle | EngSetTemp |
| 0 | 90 | 200 | 90 | 76 |
| 1 | 80 | 160 | 70 | 75 |
| 2 | 70 | 130 | 50 | 73 |
| 3 | 60 | 100 | 20 | 71 |

Controller 50 then proceeds processing the various inputs in the manner as described with respect to the automatic mode except that reference values of Table 2 are used instead of the reference values of Table 1. Particularly, in decision block 116, controller 50 determines whether ambient temperature input 56 is greater than the reference Tamb value listed in Table 2 for the comfort setting of HVAC system 20. If the temperature "on" command 76 as shown in block 102 and the process then repeats by returning to decision block 92. Further, in decision block 116, controller 50 processes EngValAvg input 58 and EngSetTemp input 62 to determine if they have values less than the EngValAvg and EngSetTemp reference values listed in Table 2 for the comfort setting of HVAC system 20. If both of these conditions are true, then controller 50 outputs an engine "on" command 76 as shown in block 102 and the process then repeats by returning to decision block 92. If neither of the two sets of conditions are true in decision block 116, then controller 50 processes A/C compressor duty cycle input 60 and timer input 64 to respectively determine if the compressor duty cycle is less than the CompDutyCycle reference value listed in Table 2 for the comfort setting of HVAC system 20 and if the "AC" has been running for at least three minutes as shown in decision block 118. If at least one of these two conditions are false, then controller 50 outputs an engine "on" command 76 as shown in block 102 and the process then repeats by returning to decision block 92. If both of these conditions are true, then controller 50 either outputs an engine "off" command 76 (if the vehicle is idle) or an A/C compressor "off" command 78 (if the vehicle is being driven) as shown in block 96 and the process then repeats by returning to decision block 92.

If controller 50 determines that HVAC system 20 is not in the maximum AC mode, a defrost mode, the automatic mode, or a manual mode, then controller 50 either outputs an engine "off" command 76 (if the vehicle is idle) or an A/C compressor "off" command 78 (if the vehicle is being driven) as shown in block 96 and the process then repeats by returning to decision block 92.

If controller 50 determines at decision block 92 that engine 40 is not running for operation of A/C compressor 37 (i.e., determines that both of the A/C compressor and the engine are off while the vehicle is idle; or determines that the A/C compressor is off with the engine on while the vehicle is being driven), then the controller proceeds at block 119 to flow chart 120 (shown in FIG. 4) to determine whether to command the engine to start running for operation of the A/C compressor.

Referring now to FIG. 4, with continual reference to FIGS. 1, 2, and 3, flow chart 120 describing operation of a flow strategy employed by controller 50 for deciding when to command engine 40 to start running for operation of A/C compressor 37 is shown. Initially, controller 50 processes engine status input 66 to determine whether engine 40 is running as shown in decision block 122 (again, the engine will be running when the vehicle is being driven). If engine 40 is not running (which may occur when the vehicle is idle), then controller 50 processes HVAC mode input 52 and Tamb input 56 to respectively determine if "AC" is selected and if the ambient temperature is at least 32° F. as shown in decision block 124. If at least one of these engine "off" command as shown in block 126. The net result is that engine 40 (and thereby A/C compressor 37) remain turned off. The process then repeats by returning to decision block 122.

If controller 50 determines that "AC" is selected and the ambient temperature is at least 32° F. at decision block 124, then the controller processes HVAC mode input 52 to determine the mode of HVAC system 20.

If controller 50 determines that HVAC system 20 is in the maximum AC mode at decision block 128, then the controller processes Tamb input 56 to determine whether the ambient temperature is at least 50° F. as shown in decision "on" command 76 and an A/C compressor "on" command 78 as shown in block 132. The net result is that both engine 40 and A/C compressor 37 are turned on. The process then repeats from block 132 by returning to decision block 122. Further, in decision block 130, controller 50 processes Tevap input 72 to determine if it has a value of greater than 75° F. and processes EngSetTemp input 62 to determine if it has a value less than 75° F. If both of these conditions 76 and an A/C compressor "on" command 78 as shown in block 132 and the process then repeats by returning to decision block 122. Further in decision block 130, controller 50 processes EngValAvg input 58 to determine if it has a value greater than 80° F. and processes EngSetTemp input 62 to determine if it has a value less than 75° F. If both of engine "on" command 76 and an A/C compressor "on" command 78 as shown in block 132 and the process then repeats by returning to decision block 122. Further in decision block 130, controller 50 processes EngTdischarge input 74 to determine if it has a value greater than 82° F. and processes EngSetTemp input 62 to determine if it has a value less than 75° F. If both of these conditions are true, then controller "on" command 78 as shown in block 132 and the process then repeats by returning to decision block 122. If controller 50 determines in decision block 130 that none of these four sets of conditions are true, then the controller outputs an engine "off" command as shown in block 126 and the process then repeats by returning to decision block 122.

If controller 50 determines that HVAC system 20 is in a defrost mode at decision block 136, then the controller outputs an engine "on" command 76 and an A/C compressor "on" command 78 as shown in block 132 and the process then repeats by returning to decision block 122.

If controller 50 determines that HVAC system 20 is in the automatic mode at decision block 138, then the controller processes HVAC comfort setting input 54 to determine the comfort setting ("0", "1", "2", or "3") of HVAC system 20. In general, controller 50 then compares various inputs (namely, ambient temperature input 56, EngValAvg input 58, evaporator temperature input 72, EngSetTemp input 62, and EngTdischarge input 74) with reference values set forth in the following Table 3 to determine whether to start engine 40 running for operation of A/C compressor 37. As shown, the reference values listed in Table 3 depend upon the comfort setting of HVAC system 20.

TABLE 3

(Automatic Mode)

| Comfort | Tamb | EngValAvg | EvapTemp | EngSetTemp | EngTdischarge |
|---------|------|-----------|----------|------------|---------------|
| 0 | 95 | 210 | 80 | 75 | 82 |
| 1 | 85 | 170 | 70 | 74 | 72 |
| 2 | 75 | 140 | 60 | 72 | 62 |
| 3 | 65 | 110 | 50 | 70 | 52 |

As such, in decision block 140, controller 50 determines whether ambient temperature input 56 is greater than the reference Tamb value listed in Table 3 for the comfort setting of HVAC system 20. For example, if the comfort setting of HVAC system 20 is "0", then controller 50 determines whether ambient temperature input 56 is greater than 95° F.; similarly, if the comfort setting of the HVAC system is "2", then the controller determines whether the ambient temperature input is greater than 75° F. If the an engine "off" command as shown in block 126 and the process then repeats by returning to decision block 122. Further, in decision block 140, controller 50 processes evaporator temperature input 72 to determine if it has a value greater than the EvapTemp reference value listed in Table 3 for the comfort setting of HVAC system 20 and the controller processes EngSetTemp input 62 to determine if it has a value less than the EngSetTemp reference value listed in Table 3 for the comfort setting of the HVAC system. For example, if the comfort setting is "2", then controller 50 determines whether evaporator temperature input 72 is greater than the reference value of 60° F. and the controller determines whether EngSetTemp input 62 is less than the reference value of 72° F. If any of these two conditions are shown in block 126 and the process then repeats by returning to decision block 122. Further, in decision block 140, controller 50 processes EngValAvg input 58 to determine if it has a value less than the EngValAvg reference value listed in Table 3 for the comfort setting of HVAC system 20 and the controller processes EngSetTemp input 62 to determine if it has a value less than the EngSetTemp reference value listed in Table 3 for the comfort setting of the HVAC system. If any of these two conditions are false, in block 126 and the process then repeats by returning to decision block 122. Further, in decision block 140, controller 50 processes EngTdisharge input 74 to determine if it has a value greater than the EngTdisharge reference value listed in Table 3 for the comfort setting of HVAC system 20 and the controller processes EngSetTemp input 62 to determine if it has a value less than the EngSetTemp reference value listed in Table 3 for the comfort setting of the HVAC system. If any of these two conditions are false, in block 126 and the process then repeats by returning to decision block 122.

If any of these four sets of conditions are true "on" command 76 and an A/C compressor "on" command 78 as shown in block 132 and the process then repeats by returning to decision block 122.

If controller 50 determines that HVAC system 20 is in a panel, panel/floor, or floor mode at decision block 142, then the controller processes HVAC comfort setting input 54 to determine the comfort setting ("0", "1", "2", or "3") of HVAC system 20. In general, controller 50 then compares the various inputs (namely, ambient temperature input 56, EngValAvg input 58, evaporator temperature input 72, EngSetTemp input 62, and EngTdischarge input 74) with reference values set forth in the following Table 4 to determine whether to start engine 40 running for operation of A/C compressor 37. As shown, the reference values listed in Table 4 depend upon the comfort setting of HVAC system 20.

TABLE 4

(Panel, Panel/Floor, Floor Modes)

| Comfort | Tamb | EngValAvg | EvapTemp | EngSetTemp | EngTdischarge |
|---------|------|-----------|----------|------------|---------------|
| 0 | 95 | 210 | 80 | 75 | 82 |
| 1 | 85 | 170 | 70 | 74 | 72 |
| 2 | 75 | 140 | 60 | 72 | 62 |
| 3 | 65 | 110 | 50 | 70 | 52 |

Controller 50 then proceeds processing the various inputs in the manner as described with respect to the automatic mode of FIG. 4 except that reference values of Table 4 are used instead of the reference values of Table 3. Particularly, in decision block 144, controller 50 determines whether ambient temperature input 56 is greater than the reference Tamb value listed in Table 4 for the comfort setting of HVAC system 20. If the temperature "off" command as shown in block 126 and the process then repeats by returning to decision block 122. Further, in decision block 144, controller 50 processes evaporator temperature input 72 to determine if it has a value greater than the EvapTemp reference value listed in Table 4 for the comfort setting of HVAC system 20 and the controller processes EngSetTemp input 62 to determine if it has a value less than the EngSetTemp reference value listed in Table 4 for the comfort setting of the HVAC system. If any of these engine "off" command as shown in block 126 and the process then repeats by returning to decision block 122. Further, in decision block 144, controller 50 processes EngValAvg input 58 to determine if it has a value less than the EngValAvg reference value listed in Table 4 for the comfort setting of HVAC system 20 and the controller processes EngSetTemp input 62 to determine if it has a value less than the EngSetTemp reference value listed in Table 4 for the comfort setting of the HVAC system. If any of these two "off" command as shown in block 126 and the process then repeats by returning to decision block 122. Further, in decision block 144, controller 50 processes EngTdisharge input 74 to determine if it has a value greater than the EngTdisharge reference value listed in Table 4 for the comfort setting of HVAC system 20 and the controller processes EngSetTemp input 62 to determine if it has a value less than the EngSetTemp reference value listed in Table 4 for the comfort setting of the HVAC system. If any of these engine "off" command as shown in block 126 and the process then repeats by returning to decision block 122.

If any of these four sets of conditions are true "on" command 76 and an A/C compressor "on" command 78 as shown in block 132 and the process then repeats by returning to decision block 122.

If controller 50 determines that HVAC system 20 is not in any of the maximum AC mode, the defrost modes, the outputs an engine "off" command as shown in block 126 and the process then repeats by returning to decision block 122.

If controller 50 determines at decision block 122 that engine 40 is running for operation of A/C compressor 37 (i.e., determines that the vehicle is being driven or that the engine is running while the vehicle is at idle), then the controller proceeds at block 146 back to flow chart 90 (shown in FIG. 3) to determine whether to keep the engine running for operation of the A/C compressor.

While controller 50 determines at decision block 122 that engine 40 is not running (and thereby that A/C compressor 37 is turned off), the controller outputs the climate action outputs 80, 82, 84, 86, and 88 for controlling other elements of HVAC system 20 in order to delay loss of cooling comfort while the A/C compressor is turned off as shown by block 148.

While the best mode for carrying out the invention has been described in detail, those familiar with the art to which this invention relates will recognize various alternative designs and embodiments for practicing the invention as defined by the following claims.

What is claimed:

1. A method for operating a hybrid vehicle, the method comprising:
   determining whether a hybrid vehicle is at idle or is being driven;
   determining an operating mode of a climate control system of the vehicle, wherein the climate control system is operable at a given time in one of at least two different operating modes;
   determining whether an A/C compressor of the climate control system is required to be turned on in order to maintain air conditioning comfort in the vehicle, wherein the A/C compressor is turned on when the A/C compressor is coupled to an engine of the vehicle and the engine is turned on, wherein the A/C compressor is turned off when either the A/C compressor is uncoupled from the engine or the engine is turned off, wherein both the A/C compressor and the engine are initially turned on;
   wherein determining whether the A/C compressor is required to be turned on includes comparing an ambient temperature in the vehicle to an ambient temperature threshold respectively associated with the operating mode of the climate control system and determining that the A/C compressor is required to be turned on if the ambient temperature is greater than the ambient temperature threshold;
   wherein, if the ambient temperature is less than the ambient temperature threshold, determining whether the A/C compressor is required to be turned on further includes comparing a duty cycle of the A/C compressor after the A/C compressor has been turned on for a period of time to a duty cycle threshold respectively associated with the operating mode of the climate control system, determining that the A/C compressor is required to be turned on if the duty cycle of the A/C compressor is greater than the duty cycle threshold, and determining that the A/C compressor is not required to be turned on if the duty cycle of the A/C compressor is less than the duty cycle threshold;
   turning off the engine and thereby turning off the A/C compressor if the A/C compressor is not required to be turned on and if the vehicle is at idle; and
   turning off the A/C compressor without turning off the engine by uncoupling the A/C compressor from the engine if the A/C compressor is not required to be turned on and if the vehicle is being driven.

2. The method of claim 1 further comprising:
   determining a comfort setting of the climate control system, wherein the climate control system is operable at a given time in one of at least two different comfort settings for at least one of the operating modes, wherein the ambient temperature threshold respectively associated with the operating mode of the climate control system is an ambient temperature threshold respectively associated with the comfort setting of the operating mode of the climate control system.

3. The method of claim 1 further comprising:
   determining a comfort setting of the climate control system, wherein the climate control system is operable at a given time in one of at least two different comfort settings for at least one of the operating modes, wherein the duty cycle threshold respectively associated with the operating mode of the climate control system is a duty cycle threshold respectively associated with the comfort setting of the operating mode of the climate control system.

4. The method of claim 1 further comprising:
   determining a comfort setting of the climate control system, wherein the climate control system is operable at a given time in one of at least two different comfort settings for at least one of the operating modes, wherein the ambient temperature threshold respectively associated with the operating mode of the climate control system is an ambient temperature threshold respectively associated with the comfort setting of the operating mode of the climate control system and the duty cycle threshold respectively associated with the operating mode of the climate control system is a duty cycle threshold respectively associated with the comfort setting of the operating mode of the climate control system.

5. The method of claim 1 further comprising:
   operating elements of the climate control system after the A/C compressor has been turned off in order to delay loss of air conditioning comfort in the vehicle.

6. The method of claim 1 further comprising:
   after turning off the engine and thereby turning off the A/C compressor,
   determining whether the A/C compressor is required to be turned on for air conditioning comfort in the vehicle, and
   turning on the engine and thereby turning on the A/C compressor if the A/C compressor is required to be turned on for air conditioning comfort in the vehicle.

7. The method of claim 6 further comprising:
   in response to determining that A/C compressor is not required to be turned on for air conditioning comfort in the vehicle after the engine and thereby the A/C compressor have been turned off, keeping the engine turned off while the vehicle is at idle.

8. A hybrid vehicle comprising:
   a climate control system having an A/C compressor, wherein the climate control system is operable at a given time in one of at least two different operating modes, wherein the A/C compressor is turned on when the A/C compressor is coupled to an engine and the engine is turned on, wherein the A/C compressor is turned off when either the A/C compressor is uncoupled from the engine or the engine is turned off, wherein both the A/C compressor and the engine are initially turned on; and
   a controller configured to determine whether the vehicle is at idle or is being driven and to determine an operating mode of the climate control system;
   the controller further configured to determine whether the A/C compressor is required to be turned on in order to maintain air conditioning comfort in the vehicle by comparing an ambient temperature inside the vehicle to an ambient temperature threshold respectively associated with the operating mode of the climate control system, wherein the controller determines that the A/C compressor is required to be turned on if the ambient temperature is greater than the ambient temperature threshold;

if the ambient temperature is less than the ambient temperature threshold, the controller further configured to determine whether the A/C compressor is required to be turned on in order to maintain air conditioning comfort in the vehicle by comparing a duty cycle of the A/C compressor after the A/C compressor has been turned on for a period of time to a duty cycle threshold respectively associated with the operating mode of the climate control system, wherein the controller determines that the A/C compressor is required to be turned on if the duty cycle of the A/C compressor is greater than the duty cycle threshold and determines that the A/C compressor is not required to be turned on if the duty cycle of the A/C compressor is less than the duty cycle threshold;

the controller further configured to turn off the engine and thereby turns off the A/C compressor if the A/C compressor is not required to be turned on and if the vehicle is at idle;

the controller further configured to uncouple the A/C compressor from the engine to turn off the A/C compressor without turning off the engine if the A/C compressor is not required to be turned on and if the vehicle is being driven.

\* \* \* \* \*

UNITED STATES PATENT AND TRADEMARK OFFICE
CERTIFICATE OF CORRECTION

PATENT NO.       : 7,617,692 B2                              Page 1 of 1
APPLICATION NO. : 11/275081
DATED            : November 17, 2009
INVENTOR(S)      : Dage et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Nineteenth Day of October, 2010

David J. Kappos
*Director of the United States Patent and Trademark Office*